(12) United States Patent
Li et al.

(10) Patent No.: US 7,554,955 B2
(45) Date of Patent: Jun. 30, 2009

(54) METHOD FOR DETECTING RANDOM ACCESS OF USER EQUIPMENT

(75) Inventors: Feng Li, Beijing (CN); Tiezhu Xu, Beijing (CN); Libao Zhang, Beijing (CN); Xiaolong Ran, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 711 days.

(21) Appl. No.: 11/230,297

(22) Filed: Sep. 19, 2005

(65) Prior Publication Data

US 2006/0050775 A1 Mar. 9, 2006

Related U.S. Application Data

(63) Continuation of application No. PCT/CN2004/000218, filed on Mar. 18, 2004.

(30) Foreign Application Priority Data

Mar. 18, 2003 (CN) ................................ 03 1 19174

(51) Int. Cl.
*H04B 7/216* (2006.01)
(52) U.S. Cl. ........................................ 370/335; 370/342
(58) Field of Classification Search ........................ None
See application file for complete search history.

(56) References Cited

U.S. PATENT DOCUMENTS 6,392,590 B1 * 5/2002 Kagemoto ............. 342/357.06
6,442,189 B1 * 8/2002 Song et al. ................. 375/139
6,466,958 B1 * 10/2002 Van Wechel et al. ........ 708/422
2002/0041578 A1   4/2002 Kim et al.
2002/0080760 A1   6/2002 Anja et al.
2008/0219190 A1 * 9/2008 Haartsen ..................... 370/280

FOREIGN PATENT DOCUMENTS

DE        19723090      12/1998
KR        2001-0060029   7/2001

* cited by examiner

*Primary Examiner*—Jayanti K Patel
*Assistant Examiner*—Anthony Sol
(74) *Attorney, Agent, or Firm*—Harness, Dickey & Pierce, P.L.C.

(57) ABSTRACT

The present invention discloses a method for detecting random access of User Equipment (UE), applicable to a mobile communication system consisting of at least one Base Station (BS) and a group of UEs; wherein the BS and the group of UE use a set of N (N is a positive integer) orthogonal or quasi-orthogonal pseudo-random sequence codes for UEs' random access. The method comprises: BS receiving a random access signal, and making correlation operation of the received signal with each pseudo-random sequence code in said code set successively to obtain a corresponding correlation result window; finding the maximum correlation peak in the correlation result window, and then dividing a correlation peak window and the front-side and rear-side windows thereof; setting one or more thresholds and comparing them with correlation results in the correlation peak window or in the correlation peak window and the front-side and rear-side windows; when conditions are satisfied, determining that the pseudo-random sequence code involved in the above correlation operation is the pseudo-random sequence code selected by the UE randomly accessed at the moment; thereby, detecting each randomly accessed UE.

25 Claims, 3 Drawing Sheets

METHOD FOR DETECTING RANDOM ACCESS OF USER EQUIPMENT

CROSS-REFERENCE TO RELATED APPLICATIONS

This application is a continuation of International Application No. PCT/CN2004/000218 filed Mar. 18, 2004. This application claims the benefit of Chinese Application No. CN 03119174.6 filed Mar. 18, 2003. The disclosures of the above applications are incorporated herein by reference.

FIELD OF THE INVENTION

The present invention relates to wireless mobile communication technology, and more particularly to a method for detecting random access of user equipment (UE) to a mobile communication system. With this method, a base station can detect the random access of single user equipment or detect at the same time the random access of a plurality of UEs.

BACKGROUND OF THE INVENTION

FIG. 1 shows a mobile communication system consisting of a base station (BS) and n (n is a positive integer) user equipments (UE01, UE02 ..., UEn).

In said mobile communication system applying CDMA technology with at least one base station and a group of UEs, if the uplinks of a plurality of UEs (referring to the radio links from UE to BS, that is, 1001, 1002 ... 100n as shown in FIG. 1) are synchronized, the performance of the system would be greatly improved. 2001, 2002 ... 200n shown in FIG. 1 represent the downlinks from the BS to each UE.

Now referring to FIG. 2, in the uplink synchronized CDMA system, synchronization of uplinks of each UE is typically established through the following steps:

(1) each UE sending a specific uplink synchronizing random access signal;

(2) BS detecting each uplink synchronizing random access signal, and obtaining the uplink timing information of each UE; then the BS transferring a timing synchronization adjusting command (synchronization adjusting information) to the UE through a specific downlink channel, such as FACH (Forward Access Channel);

(3) each UE adjusting its own timing based on said command and accessing the system in a specific access channel, such as RACH (Random Access Channel).

Since a plurality of UEs are allowed to access the system at the same time, each UE usually adopts an orthogonal or quasi-orthogonal pseudo-random code (PN) as its uplink synchronizing random access signal. In a mobile communication system implementing the random access of multi-UE by adopting pseudo-random codes, based on the orthogonality of the pseudo-random codes, the BS can get the information of simultaneously accessed UEs through detecting the uplink synchronizing signals sent by each UE in the mobile circumstance.

In a mobile communication system consisting of at least one BS and a group of UEs, shown in FIG. 1, a set of (N) orthogonal or quasi-orthogonal pseudo-random sequence codes $\overline{m}_1, \overline{m}_2 \ldots \overline{m}_N$ (vectors) can be assigned to the BS, and one of said codes will be selected by one UE in the group. The set of orthogonal or quasi-orthogonal pseudo-random sequence codes satisfies the following correlation properties:

$$\overline{m}_i \cdot \overline{m}_j = \begin{cases} L & i = j \\ 0 \text{ or} \approx 0 & i \neq j, \end{cases} i, j = 1 \sim N$$

wherein, the "●" represents dot product. The dot product of any two different orthogonal or quasi-orthogonal pseudo-random sequence codes ($i \neq j$) in said set (N in number) is 0 or approximates to 0, and the dot product of any identical orthogonal or quasi-orthogonal pseudo-random sequence codes ($i = j$) in the set is a constant L.

The uplink synchronizing random access signal sent by UE contains a pseudo-random sequence code. On theoretic, with the correlation properties of the pseudo-random sequence codes, the BS can detect the uplink synchronizing signal of each UE by using various kinds of mature correlation operations, such as direct sequence convolution (linear correlation) or matched filtering, etc., combined at the same time with a series of relevant decision conditions.

Nevertheless, in the condition that the uplink synchronizing random access signal that UE adopts is orthogonal or quasi-orthogonal pseudo-random sequence code, there would be serious multi-path interferences in some mobile channels, and thus it is difficult to achieve complete orthogonality between different orthogonal and quasi-orthogonal codes, which make the signal detection more complex. Therefore, it is quite difficult to detect rapidly, reliably and accurately, the uplink synchronizing random access signals sent by a plurality of UEs.

SUMMARY OF THE INVENTION

The present invention discloses a method for simultaneously, rapidly and accurately detecting random access of single or a plurality of UEs.

The technical scheme of the present invention can be as follows: a method for detecting random access of UE applied in a mobile communication system which consists of at least one BS and a group of UEs; wherein said BS and said group of UEs use a set of N (N is a positive integer) orthogonal or quasi-orthogonal pseudo-random sequence codes for the random access of UEs; and by detecting the pseudo-random sequence code selected by each UE, BS can simultaneously detect the random access of UEs; the method comprising:

A. BS making a correlation operation of the received random access signal from UE at one moment containing information of the pseudo-random sequence codes selected by the accessing UEs with a pseudo-random sequence code from the local pseudo-random sequence code set of the BS, and obtaining a corresponding correlation result window, wherein said correlation operation starts from any pseudo-random sequence code of the pseudo-random sequence code set and ends after all the N pseudo-random sequence codes are operated;

B. finding the maximum correlation peak value point in every correlation result window;

C. based on the position of each correlation peak value point, finding a correlation peak window in the corresponding correlation result window, or finding a correlation peak window and the front-side and rear-side windows at both sides of the correlation peak window in the correlation result window;

D. selecting one or more thresholds, comparing the correlation results in every correlation peak window or every correlation peak window and its front-side and rear-side windows with said one or more thresholds in one or more conditions respectively, if all the conditions are satisfied, determining that the pseudo-random sequence code taking part in the correlation operation in Step A is the pseudo-random sequence code selected by a UE accessing at that moment.

The technical scheme of the present invention can also be as follows: a method for detecting random access of UE applied in a mobile communication system which consists of at least one BS and a group of UEs; wherein the BS and the group of UE use a set of N (N is a positive integer) orthogonal or quasi-orthogonal pseudo-random sequence codes for UE random access; and by detecting the pseudo-random sequence code selected by each randomly accessed UE, BS can detect simultaneously the random access of UEs; the method comprising the steps of:

A1. BS making a correlation operation of the random access signal received at one moment from UE containing information of the pseudo-random sequence codes selected by the accessing UEs with a pseudo-random sequence code from the local pseudo-random sequence code set of the BS, and obtaining a corresponding correlation result window;

B1. finding the maximum correlation peak value in said correlation result window;

C1. based on the position of the correlation peak value, dividing a correlation peak window from the correlation result window, or dividing a correlation peak window and its front-side and rear-side windows from the correlation result window;

D1. selecting one or more thresholds, and compare the correlation result in the correlation peak window or the correlation peak window and its front-side and rear-side windows with the one or more thresholds; if the comparison satisfies the corresponding one or more thresholds selected, determining that the pseudo-random sequence code taking part in the correlation operation in Step A1 is the pseudo-random sequence code selected by a UE accessing at that moment.

The present invention provides a new method for detecting random access of one UE or a plurality of UE in a mobile communication system. Said mobile communication system has at least one BS and a group of UEs. A set of (N) orthogonal or quasi-orthogonal pseudo-random sequence codes is assigned to the BS and the group of UEs. Each UE selects randomly a pseudo-random sequence code from the set of pseudo-random sequence codes for random access. With orthogonality among the set of pseudo-random sequence codes and by means of the detection method of this invention, the BS can simultaneously detect random access of one or a plurality of UEs by detecting the pseudo-random sequence code that is selected by each random access UE.

The present invention utilizes the orthogonality among the orthogonal or quasi-orthogonal pseudo-random sequence codes. BS makes a correlation operation of the access signal sent by UE at one moment (represented by Vector $\overline{sig}$, and containing one or a plurality of pseudo-random sequence codes selected randomly by UE or assigned to UE from the set of pseudo-random sequence codes) with every pseudo-random sequence code from said set of pseudo-random sequence codes (there are totally N times of correlation operation), and then compares the maximum correlation peak of each result of N times correlation operations, and/or the maximum correlation peak of each result of N times correlation operations and the correlation peak points in front-side and rear-side windows, and/or the mean power value, total power value, effective mean power value and effective total power value of all the correlation points within a certain window of the above correlation peak points, and/or the corresponding differences with the thresholds obtained through emulation; and/or counts the number of the correlation point whose value is greater than the threshold and then compares said number with one or several thresholds. In this way, the BS can detect pseudo-random sequence codes selected by one or a plurality of UEs that randomly and simultaneously accesses the system at that moment, thereby detecting said one or a plurality of UE that randomly and simultaneously accesses the system at the moment.

By adopting correlation window computation and selection of correlation peak window as well as front-side and rear-side windows thereof, the present invention is able to detect the random access of one UE or a plurality of simultaneously accessed UEs using randomly selected or assigned pseudo-random sequence code, implementing detection of one UE or a plurality of UEs getting accessed simultaneously and randomly.

Comparing with the prior art, given that a proper correlator is selected and one or a plurality of detecting thresholds are set in accordance with the present invention, due to the setting of a special peak window, maximum multi-path information is contained in the peak window, and other interferences are eliminated from the peak window as much as possible, so the multi-path information potentially existing in the UE access signal can be utilized, and the reliability and accuracy of the detection are enhanced. Meanwhile with the method of present invention, it is easy to detect simultaneously the random access of one or a plurality of UEs getting accessed randomly and simultaneously.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
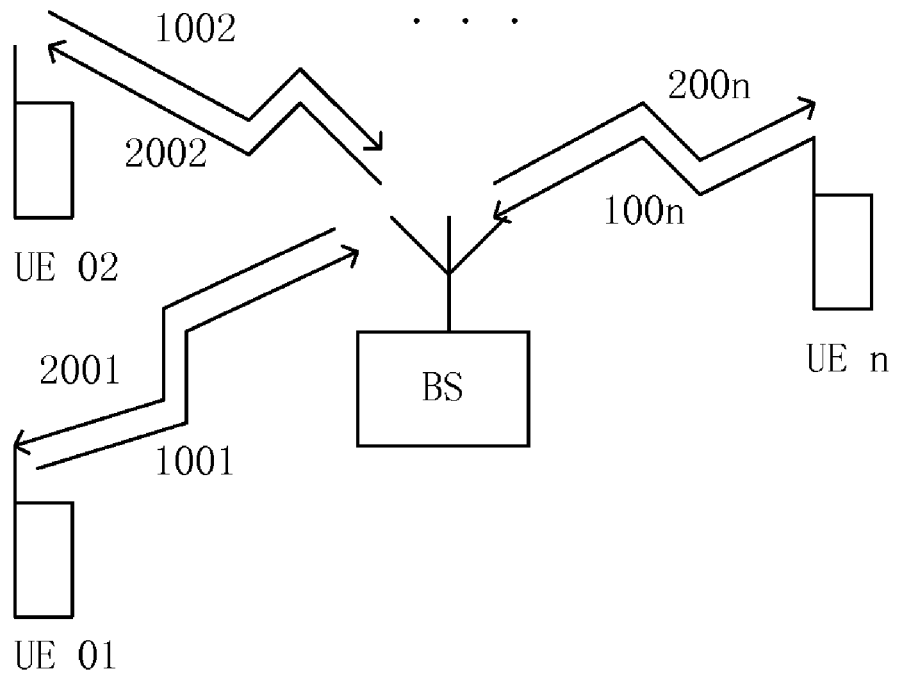
FIG. 1 shows a mobile communication system with one BS and a group of (N) UEs.
Figure 2:
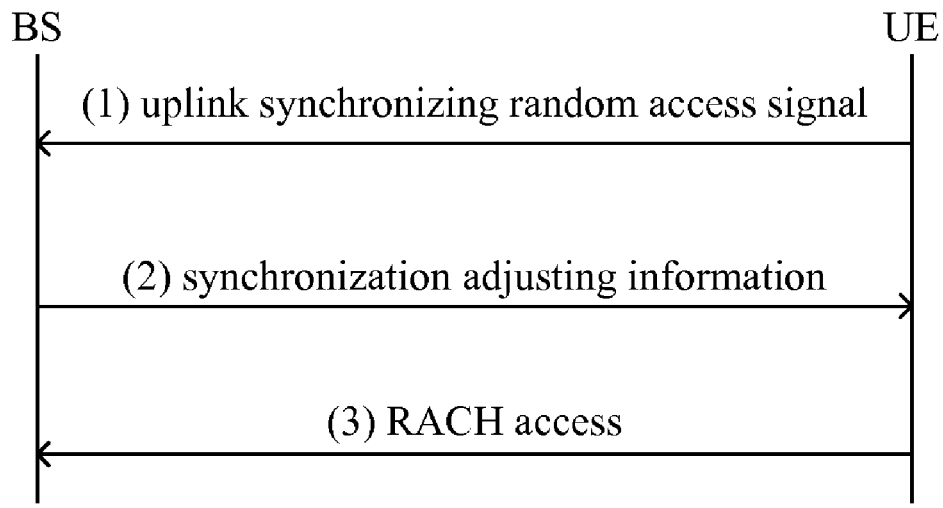
FIG. 2 is a schematic diagram showing the random access procedure of UE.

The following description of the preferred embodiment(s) is merely exemplary in nature and is in no way intended to limit the invention, its application, or uses.

The preferred embodiments will be described in more detail hereinafter with references to the accompany drawings.

In a mobile communication system consisting of at least one BS and a group of UEs, BS has a set of (N) orthogonal or quasi-orthogonal pseudo-random sequence codes $\overline{m}_1, \overline{m}_2 \ldots \overline{m}_N$, any UE of the UE group will select a pseudo-random sequence code from the code set for accessing the system. When a UE randomly selects a code (or a plurality of codes)

from the set of pseudo-random sequence codes, such as $\overline{m}_x$ for accessing, the BS will receive a random access signal $\overline{sig}$ sent by the UE that contains the $\overline{m}_x$ code information in it. Suppose that at a moment, there are simultaneously several UEs each randomly selecting one code (several $\overline{m}_x$) from the set of pseudo-random sequence codes for accessing, then the BS will receive the random access signal $\overline{sig}$ sent by these UEs that contains information of the codes randomly selected by each of the UEs. This invention is accordingly a process in which based on the orthogonality among the pseudo-random sequence codes, by making correlation operation between each pseudo-random sequence code of the pseudo-random sequence code set $\overline{m}_1, \overline{m}_2 \ldots \overline{m}_N$ and the received signal $\overline{sig}$, the BS determines that the $\overline{m}_x$ information is contained in the signal $\overline{sig}$ according to the detection of the correlation peak values.

For the sake of detecting the random access of UE based on the orthogonality among the pseudo-random sequence codes, first, BS needs to make correlation operation between each pseudo-random sequence code $\overline{m}_i$ (i=1–N) and the received signal $\overline{sig}$ to obtain a correlation result $\overline{cor}_i$, which is a correlation result window. The correlation operation can be carried out by any kind of correlators, such as matched filter, direct sequence convolution etc. Then, it is necessary to find a maximum correlation peak value in the correlation result window and to define a threshold T based on emulated results. Compare the threshold T with the maximum correlation peak, or with the mean of the correlation values within a window of the maximum correlation peak, and finally determine whether the received signal $\overline{sig}$ contains the pseudo-random sequence code $\overline{m}_i$.

It is necessary to point out that as it is possible that the received signal $\overline{sig}$ has multi-path interference or other kind of interferences, for a better detection accuracy, more than one threshold can be set to make multiple-condition judgments, such as comparing to maximum correlation peak, maximum correlation peak and other correlation peaks other than the maximum peak, or the mean of the correlation peaks within a window of these correlation peaks, and judging by counting the number of the correlation results that is larger than a certain threshold, etc.

With the method of the present invention, it is allowed to detect at most N UE simultaneously accessing the system, where N is the number of pseudo-random sequence codes in the orthogonal or quasi-orthogonal pseudo-random sequence code set.

Figure 3:
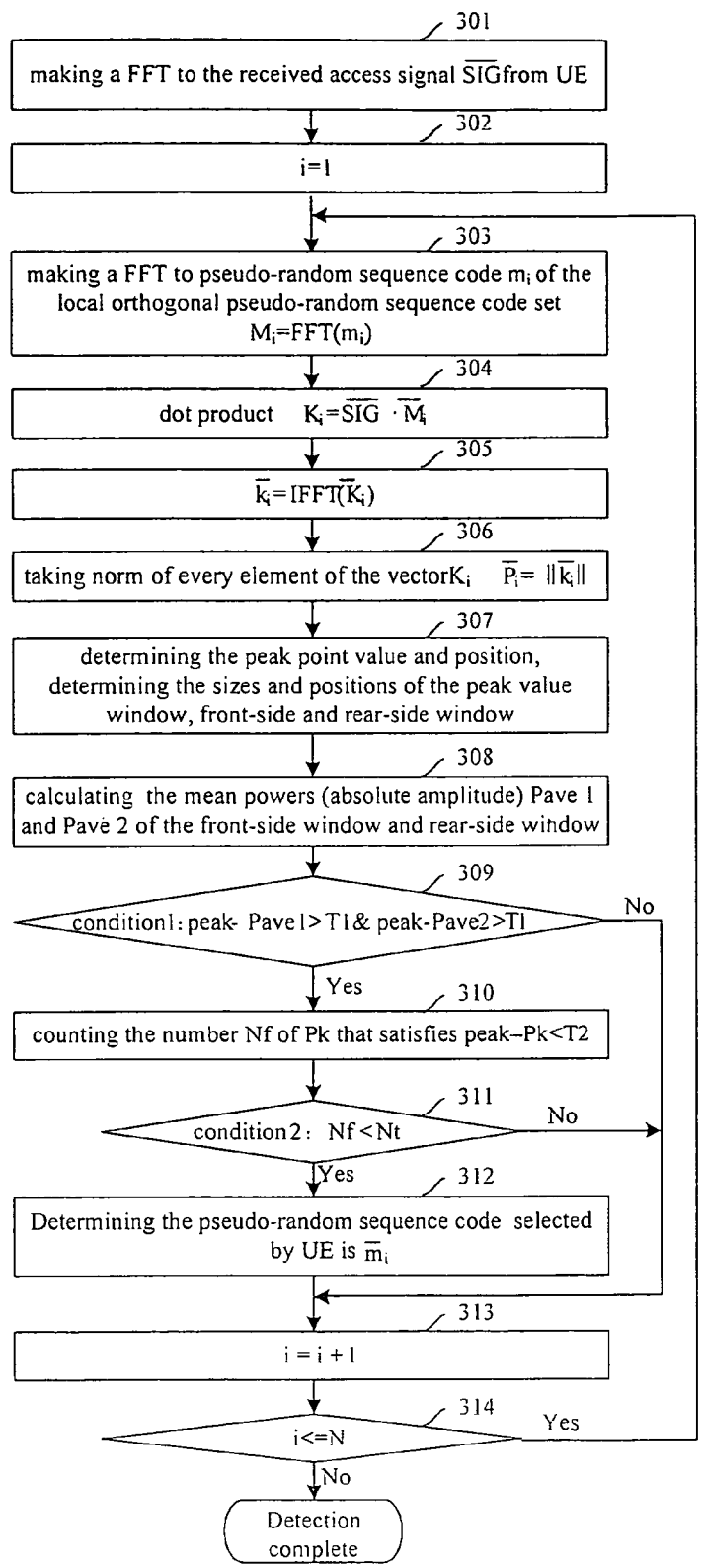
FIG. 3 is the flowchart for detecting the random access of UE according to a preferred embodiment of the present invention.

FIG. 3 shows a flowchart of BS detecting the random access of UE according to a preferred embodiment of the present invention. With the detecting method in accordance with this invention, the pseudo-random sequence codes selected by each simultaneously accessed UEs can be determined, i.e. all the UEs getting accessed at one time can be detected. This embodiment is applied in a TD-SCDMA system and takes the matched filtering as the correlation operation to detect random access of UE based on the results of the correlation operation. Only N times of correlation operations are needed to detect the random access of all UEs, at most N UEs at one time.

Step 301: BS making a Fast Fourier Transformation (FFT) to the received access signal $\overline{sig}$ from UE containing pseudo-random sequence codes randomly selected by each UE:

$\overline{SIG} = FFT(\overline{sig})$

Steps 302 and 303: BS making a FFT to every pseudo-random sequence code of the local orthogonal pseudo-random sequence code set (N codes), e.g. starting from the first code (i=1):

$\overline{M}_i = FFT(\overline{m}_i)$, (i=1 to N)

Step 304: using matched filtering, BS making a correlation operation, i.e. dot product, between $\overline{M}_i$ and $\overline{SIG}$ (both are sequence signals) obtained through FFT in the above steps, to obtain the correlation operation result $\overline{K}_i$ (vector):

$\overline{K}_i = \overline{M}_i \cdot \overline{SIG}$

Step 305: making an Inverse Fast Fourier Transformation (IFFT) to the above correlation operation result $\overline{K}_i$ to obtain the result $\overline{k}_i$ (vector):

$\overline{k}_i = IFFT(\overline{K}_i)$

Step 306: taking the norm of every element of the vector $\overline{k}_i$: $\overline{P}_i = \|\overline{k}_i\|$, wherein the $\|\overline{k}_i\|$ represents taking norm of every element of the vector $\overline{k}_i$ to obtain the correlation result window, which can be in the form of power or the form of absolute amplitude (but not limited to these forms); $\overline{P}_i$ in the equation is the correlation result window in the form of power (description hereinafter is given with only the correlation result window in the form of power, and correlation result window in the form of absolute amplitude has the same processing procedure as that in the form of power).

Figure 4:
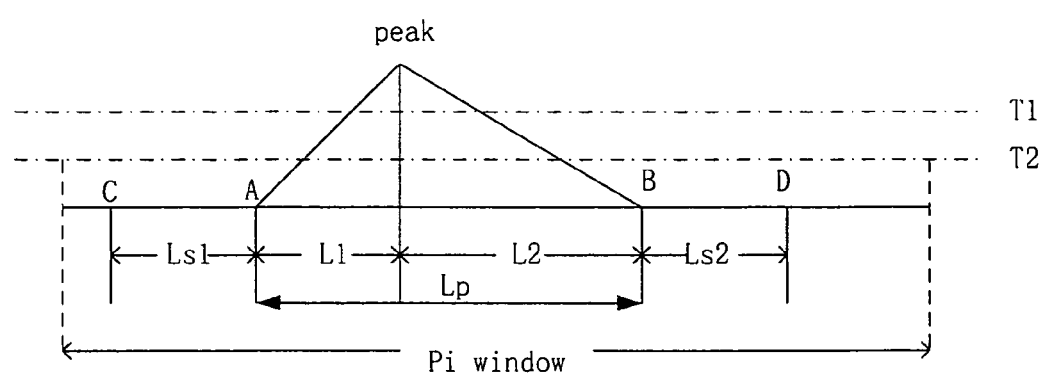
FIG. 4 is a schematic diagram showing the correlation peak window, front-side and rear-side windows thereof in the correlation window, and their comparison with the given thresholds according to a preferred embodiment of the present invention.

Step 307: Determining the value and position of the peak point in the correlation power (or the absolute amplitude) window (Pi window) $\overline{P}_i$, the size and position of the peak value window Lp(L1+L2), the size and position of front-side window and rear-side window Ls1, Ls2, etc. The specific determining procedure is hereinafter described with reference to FIG. 4:

1) through emulation, setting the length of the peak window Lp, where the length should be set to contain several main paths of the signal $\overline{sig}$, and through emulation, setting the length of front-side window Ls1 and the length of rear-side window Ls2 outside that peak window;

2) finding the maximum power point $\overline{P}_i$, i.e. Peak, in the correlation power window, and determining the starting position A and ending position B of the peak window, and the starting position and ending position of the front-side window and rear-side window C and D based on Peak, the length of the peak window Lp obtained through emulation, the emulation relationship shown in the equations Lp=L1+L2, L1=Lp/3, L2=2Lp/3 (designed for the multi-path delay), and the length of front-side window Ls1 and the length of rear-side window Ls2 (Ls1 and Ls2 can be equal or unequal).

Step 308: calculating, respectively, the mean powers Pave 1 and Pave 2 of the front-side window and rear-side window by calculating, respectively, the power sum of the power points contained in the front-side window and rear-side window and then dividing the power sums by the respective window lengths.

Step 309: making a judgment according to condition 1: set a first threshold T1 and the condition 1 comprises:

Peak−Pave1>T1, and

Peak−Pave2>T1;

If condition 1 cannot be satisfied, then it indicates that the pseudo-random sequence code $\overline{m}_x$ selected by the UE is not $\overline{m}_i$, and then go to Step 313 and make i=i+1; if condition 1 is satisfied, then go to Step 310 to make a judgment according to condition 2.

Steps 310 and 311: making a judgment according to condition 2:

Setting a second threshold T2 (T2<T1) and a third threshold Nt. Suppose Pk is a power point (value) in the correlation power window Pi but not in the peak window (window length Lp), then calculating Nf, the number of Pks that satisfy the following condition: peak−Pk<T2. If Nf<Nt, then condition 2 is satisfied, a determination can be made in Step 312 that the pseudo-random sequence code $\overline{m}_x$ selected randomly by the UE is $\overline{m}_i$, i.e. $\overline{m}_x=\overline{m}_i$. Otherwise, a determination can be made that the signal $\overline{sig}$ does not contain the pseudo-random sequence code that takes part in the current correlation operation, and go to Step 313 and make i=i+1.

During the implementation, a determination can be made based on only condition 1, when condition 1 is satisfied, it indicates that $\overline{m}_x=\overline{m}_i$, but in no doubts the accuracy of this determination is not as good as a decision based on the above condition 1 and condition 2 simultaneously.

Step 313 and 314: making i=i+1, and judging whether i is less than or equal to N. if i is greater than N, it means that all the N pseudo-random sequence codes have been co-related. if i is less than or equal to N, then return to Step 303 to do the above described operation to the next (i+1) pseudo-random sequence code.

During the implementation, condition 1 has various alternatives; one or some of the alternatives can be used to substitute the above Steps 308 and 309.

For example, the calculated Pave1 or Pave2 can be the total power of the correlation power in the front-side or rear-side windows, or the effective mean power thereof with the interferences eliminated, or the effective total power thereof with the interferences eliminated; then the threshold T1 should be adjusted accordingly through emulation. One or some of the values mentioned above can be selected for use in making decision, i.e. making decision based on one or some of the relevant conditions.

Another example is: first calculate, respectively, the total power, mean power, effective total power and effective mean power of the correlation power in the peak window (window length Lp); and then calculate, respectively, the differences between the calculated total power, mean power, effective total power and effective mean power and the total power, mean power, effective total power and effective mean power of the correlation power in the front-side and rear-side windows; adjust the corresponding threshold T1 through emulation; compare the calculated differences with the corresponding threshold, if the calculated differences are larger, the conditions are satisfied. One or some of the values mentioned above can be selected for use in execution, i.e. making decision based on one or some of the relevant conditions.

Another example is: only calculate the mean power, the total power, the effective mean power with the interferences eliminated and the effective total power with the interferences eliminated of the correlation power in the peak window (window length Lp); and then adjust the corresponding threshold T1 through emulation. if said mean power, total power, effective mean power and effective total power are respectively greater than relevant thresholds, the conditions are satisfied. One or some of the values mentioned above can be selected for use in execution, i.e. making decision based on one or some of the relevant conditions.

Another example is: only calculate the mean power, the total power, the effective mean power with the interferences eliminated and the effective total power with the interferences eliminated of the correlation powers in the front-side and rear-side windows; and then adjust the corresponding threshold T1 through emulation. Compare the calculated mean power, total power, effective mean power and effective total power respectively with the relevant threshold T1; if they are greater than the threshold, the conditions are satisfied. One or some of the values mentioned above can be selected for use in execution, i.e. making decision based on one or some of the relevant conditions.

The effective value mentioned is the value with the interferences eliminated from it, and the mean value and total value of the interferences can be calculated by utilizing the remaining correlation part of the entire correlation power window after removing the peak window and the front-side and rear-side windows from it, so the effective total value and the effective mean value of the correlation power window can be accordingly obtained.

While implementing, there are many other alternatives of condition 1; one or some of the alternatives can be taken to substitute Steps 308 and 309.

Similarly, there are also various alternatives of condition 2; one or some of the alternatives can be taken to substitute Steps 310 and 311.

For example, first count the number of the correlation power points whose value is greater than a given threshold (obtained by emulation); and then compare said number with a given number threshold (obtained by emulation); if said number is less than the number threshold, the condition is satisfied.

Another example is: first count, in the remaining part of the correlation power window after removing the peak window from it, the number of the correlation power point whose value is greater than a given threshold (obtained by emulation) and then compare said number with a given number threshold (obtained by emulation); if said number is less than the number threshold, the condition is satisfied.

With the detection method mentioned above, the pseudo-random sequence code selected by each UE can be determined, accordingly simultaneously accessed UEs can be detected; and based on this, and connections between the BS and each UE can be established so as to implement the UE random access. Meanwhile with the detection method of the present invention, the BS can detect simultaneously the randomly accessed UEs up to a maximum number of N that the system allows, thus realizing the detection of the random access of a plurality of UEs.

In summary, since the received signal has multi-path interference and the incomplete orthogonality between the codes, the signal detection becomes difficult and complex. However, the method of the present invention can overcome these problems and provides a rapid, reliable and accurate method for the detection of received signal.

As different UEs can randomly select their pseudo-random sequence codes for access, it is likely that two or more than two UEs may select the same pseudo-random sequence code in the same frame and try to access the same BS at the same time. Since BS uses different pseudo-random sequence codes to differentiate different accessing UEs in the same frame, when the above situation appears, BS cannot differentiate the two or more than two UEs that have selected the same pseudo-random sequence code, and there would be conflicts among the random accesses of these UEs. If BS responses to the conflicting UEs as normal under the circumstances of conflict, the response will result in receiving confusion between UEs and BS, and bring about interference between the conflicting UEs and also interference of the conflicting UE to other UEs, exerting negative impact on the performance of the whole system.

Therefore while implementing the method of the present invention, it is better to make a detection for conflict among random accesses of a plurality of UEs after Step 306, doing the random access detection of UE only after deciding that there is no random access conflict. There are many ways to perform the conflict detection during the operation: one is to set a threshold, and compare the set threshold with the relevant correlation results in the correlation peak window, or with the relevant correlation results in the correlation result window but not in the peak window, if the condition is satisfied, make a judgment in Step 304: whether the pseudo-random sequence code involved in the correlation operation with the random access signal is randomly selected by two or more than two UEs for access, if yes, there is an access conflict, and the subsequent procedure of determining the pseudo-random sequence code selected by UE should no longer continue.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for detecting random access of user equipment (UE), applicable to a mobile communication system consisting of at least one base station (BS) and a group of UEs, wherein said BS and said group of UEs use a set of N (N is a positive integer) orthogonal or quasi-orthogonal pseudo-random sequence codes for the random access of UE, and by detecting the pseudo-random sequence code selected by each randomly accessed UE, BS implements a simultaneous detection of the random access of UEs, the method comprising:
   A. BS making a correlation operation of the random access signal received at one moment from UE containing information of the pseudo-random sequence codes selected by the accessing UE with a pseudo-random sequence code from the local pseudo-random sequence code set of the BS, and obtaining a corresponding correlation result window, wherein said correlation operation starts from any pseudo-random sequence code of the pseudo-random sequence code set and ends when operations with all the N pseudo-random sequence codes are completed;
   B. finding the maximum correlation peak value point in every correlation result window;
   C. based on the position of each correlation peak value point, finding a correlation peak window in the corresponding correlation result window, or finding a correlation peak window and the front-side and rear-side windows at both sides of the correlation peak window in the correlation result window;
   D. selecting one or more thresholds, comparing the correlation results in every correlation peak window or every correlation peak window and its front-side and rear-side windows with said one or more thresholds in one or more conditions respectively, if all the conditions are satisfied, determining that the pseudo-random sequence code taking part in the correlation operation in Step A is the pseudo-random sequence code selected by a UE accessing at that moment.

2. The method for detecting random access of UE according to claim 1, further comprising after said Step C: setting a threshold, comparing said threshold with the correlation results in every correlation peak window, or with the correlation results in the side windows of every correlation result window excluding the said correlation peak window; if the comparison condition is satisfied, determining that said pseudo-random sequence code involved in the correlation operation in Step A is selected by two or more than two UEs for random access, and there is an access conflict, then stopping the execution of Step D, otherwise continuing with Step D.

3. The method for detecting random access of UE according to claim 1, wherein said number N of pseudo-random sequence codes in said pseudo-random sequence code set is a variable or fixed integer number, whose value is at least 1.

4. The method for detecting random access of UE according to claim 1, wherein said correlation operation in Step A further comprising:
   1) BS making a Fourier Transformation to the received access signal from UE, and obtaining a Fourier Transformation result;
   2) BS making a Fourier Transformation to a pseudo-random sequence code of the local pseudo-random sequence code set, and obtaining a Fourier Transformation result;
   3) BS making a dot product of the Fourier Transformation result of Step 1) and the Fourier Transformation result of Step 2), obtaining the result of the correlation operation, and then making an Inverse Fourier Transformation to the obtained result of the correlation operation;
   said obtaining a corresponding correlation result window in Step A further comprising: taking the norm of every element in said inverse Fourier transformation result of step 3) to educe said correlation result window.

5. The method for detecting random access of UE according to claim 4, wherein said taking the norm comprises: the correlation result in the form of power or absolute amplitude educed by the norm.

6. The method for detecting random access of UE according to claim 4, wherein said obtaining the result of correlation operation through dot product in Step 3) comprises conducting in a correlation detector the correlation operation including a direct sequence correlation or a matched filtering correlation.

7. The method for detecting random access of UE according to claim 1, further comprising, in Step B, if the correlation result window is in the form of power, taking the point with maximum power in the correlation power window as the correlation peak point; if the correlation result window is in the form of absolute amplitude, taking the point with maximum absolute amplitude in the correlation absolute amplitude window as the correlation peak point.

8. The method for detecting random access of UE according to claim 1, wherein said Step C further comprising:
   1) setting the length of the correlation peak window through emulation;
   2) setting the relationship between the window lengths on both sides of the maximum correlation peak point and the length of the correlation peak window through emulation;
   3) setting the lengths of the front-side window and rear-side window through emulation;
   4) based on the results of Steps 1) and 2), marking off the position of the correlation peak window that contains the maximum correlation peak point;
   5) based on the results of Steps 3) and 4), marking off the positions of the front-side window and rear-side window.

9. The method for detecting random access of UE according to claim 8, wherein, in Step 2), the window length on one side of maximum peak point is ⅓ of the length of the correlation peak window, and the window length on the other side of maximum peak point is ⅔ of the length of the correlation peak window; and in Step 3), the lengths of front-side window and rear-side window can be equal or unequal.

10. The method for detecting random access of UE according to claim 1, wherein said Step D further comprising:
   d11) calculating, respectively, the mean values and/or the total values and/or the effective mean values with the interference eliminated and/or the effective total values with the interference eliminated of the correlation results in the front-side and rear-side windows beside the correlation peak window, and calculating the differences, respectively, between the peak value of the correlation peak point and said two mean values, total values, effective mean values and/or effective total values of the front-side and the rear-side windows;
   d12) through emulation, setting thresholds corresponding to said differences calculated in Step d11;
   d13) if said differences between the peak value of the correlation peak point and said two mean values, total values, effective mean values and/or effective total values of the front-side and rear-side windows are, simultaneously, greater than said one or more thresholds, determining that the conditions are satisfied.

11. The method for detecting random access of UE according to claim 10, further comprising after Step d13 if said conditions are satisfied:
   d51) setting a threshold through emulation;
   d52) counting in the correlation peak window the number of the correlation point whose correlation result value is greater than said threshold;
   d53) setting a threshold for said counted number through emulation;
   d54) if the counted number in Step 52 is less than the set threshold in Step 53, further determining that the condition is satisfied, otherwise the condition is unsatisfied.

12. The method for detecting random access of UE according to claim 10, further comprising after Step d13 if said conditions are satisfied:
   d61) setting a threshold through emulation;
   d62) counting, in the correlation result window excluding the correlation peak window, the number of the correlation point whose correlation result value is greater than said threshold;
   d63) setting a threshold for said counted number through emulation;
   d64) if the counted number in Step 62 is less than said threshold in Step 63, the condition is satisfied, otherwise the condition is unsatisfied.

13. The method for detecting random access of UE according to claim 10, further comprising after Step d13 if said conditions are satisfied:
   d71) setting a threshold through emulation;
   d72) calculating the differences between the maximum correlation peak and each correlation result point outside the correlation peak window but in the correlation result window;
   d73) counting the number of the correlation result point with said difference less than said threshold of Step 71;
   d74) setting a threshold for said counted number through emulation;
   d75) if said counted number is less than said threshold in Step d74, the condition is satisfied, otherwise the condition is unsatisfied.

14. The method for detecting random access of UE according to claim 1, wherein said Step D further comprising:
   d21) calculating, respectively, the mean value, total value, effective mean value with the interferences eliminated, and/or effective total value with the interferences eliminated of the correlation results in the correlation peak window; calculating, respectively, the mean values, total values, effective mean values with the interferences eliminated, and/or effective total values with the interferences eliminated of the correlation results in the front-side and rear-side windows; and calculating, respectively, the corresponding differences between the mean value, total value, effective mean value and effective total value of the correlation results in the correlation peak window and the mean values, total values, effective mean values and effective total values of the correlation results in the front-side and rear-side windows;
   d22) through emulation, setting, respectively, one threshold corresponding to each of said differences in Step d21;
   d23) if the differences between the mean value, total value, effective mean value and effective total value of the correlation results in the correlation peak window and the mean values, total values, effective mean values and effective total values of the correlation results in the front-side and rear-side windows are greater than the corresponding thresholds, respectively, determining that the conditions are satisfied.

15. The method for detecting random access of UE according to claim 14, further comprising after Step d23 if said conditions are satisfied:
   d51) setting a threshold through emulation;
   d52) counting in the correlation peak window the number of the correlation point whose correlation result value is greater than said threshold;
   d53) setting a threshold for said counted number through emulation;
   d54) if the counted number in Step 52 is less than the set threshold in Step 53, further determining that the condition is satisfied, otherwise the condition is unsatisfied.

16. The method for detecting random access of UE according to claim 14, further comprising after Step d23 if said conditions are satisfied:
   d61) setting a threshold through emulation;
   d62) counting in the correlation result window excluding the correlation peak window the number of the correlation point whose correlation result value is greater than said threshold;
   d63) setting a threshold for said counted number through emulation;
   d64) if the counted number in Step 62 is less than said threshold in Step 63, determining that the condition is satisfied, otherwise the condition is unsatisfied.

17. The method for detecting random access of UE according to claim 14, further comprising after Step d23 if said conditions are satisfied:
   d71) setting a threshold through emulation;
   d72) calculating the differences between the maximum correlation peak and each correlation result point outside the correlation peak window but in the correlation result window;
   d73) counting the number of the correlation result point with said difference less than said threshold of Step 71;
   d74) setting a threshold for said counted number through emulation;
   d75) if said counted number is less than said threshold in Step d74, determining that the condition is satisfied, and otherwise the condition is unsatisfied.

18. The method detecting random access of UE according to claim 1, wherein said Step D further comprising:

d31) calculating, respectively, the mean value, total value, effective mean value with the interferences eliminated, and/or effective total value with the interferences eliminated of the correlation results in the correlation peak window;

d32) through emulation, setting, respectively, thresholds corresponding to said mean value, total value, effective mean value and/or effective total value;

d33) if said mean value, total value, effective mean value and/or effective total value of the correlation results are greater than the corresponding thresholds, respectively, determining that the conditions are satisfied.

19. The method for detecting random access of UE according to claim 18, further comprising after Step d33 if said conditions are satisfied:

d51) setting a threshold through emulation;

d52) counting in the correlation peak window the number of the correlation point whose correlation result value is greater than said threshold;

d53) setting a threshold for said counted number through emulation;

d54) if the counted number in Step 52 is less than the set threshold in Step 53, further determining that the condition is satisfied, otherwise the condition is unsatisfied.

20. The method for detecting random access of UE according to claim 18, further comprising after Step d33 if said conditions are satisfied:

d61) setting a threshold through emulation;

d62) counting, in the correlation result window excluding the correlation peak window, the number of the correlation point whose correlation result value is greater than said threshold;

d63) setting a threshold for said counted number through emulation;

d64) if the counted number in Step 62 is less than said threshold in Step 63, further determining that the condition is satisfied, otherwise the condition is unsatisfied.

21. The method for detecting random access of UE according to claim 18, further comprising after Step d 33 if said conditions are satisfied:

d71) setting a threshold through emulation;

d72) calculating the differences between the maximum correlation peak and each correlation result point outside the correlation peak window but in the correlation result window;

d73) counting the number of the correlation result point with said difference less than said threshold of Step 71;

d74) setting a threshold for said counted number through emulation;

d75) if said counted number is less than said threshold in Step d74, further determining that the condition is satisfied, and otherwise the condition is unsatisfied.

22. The method for detecting random access of UE according to claim 1, wherein said Step D further comprising:

d41) calculating, respectively, the mean values and/or the total values and/or the effective mean values with the interferences eliminated and/or the effective total values with the interferences eliminated of the correlation results in the front-side and rear-side windows on both side of the correlation peak window;

d42) through emulation, setting, respectively, thresholds corresponding to said mean values, total values, effective mean values and effective total values;

d43) if said mean values, total values, effective mean values and/or effective total values of the correlation results are greater than the corresponding thresholds respectively, determining that the conditions are satisfied.

23. The method for detecting random access of UE according to claim 22, further comprising after Step d43 if said conditions are satisfied:

d51) setting a threshold through emulation;

d52) counting t in the correlation peak window he number of the correlation point whose correlation result value is greater than said threshold;

d53) setting a threshold for said counted number through emulation;

d54) if the counted number in Step 52 is less than the set threshold in Step 53, further determining that the condition is satisfied, otherwise the condition is unsatisfied.

24. The method for detecting random access of UE according to claim 22, further comprising after Step d43 if said conditions are satisfied:

d61) setting a threshold through emulation;

d62) counting, in the correlation result window excluding the correlation peak window the number of the correlation point whose correlation result value is greater than said threshold;

d63) setting a threshold for said counted number through emulation;

d64) if the counted number in Step 62 is less than said threshold in Step 63, further determining that the condition is satisfied, otherwise the condition is unsatisfied.

25. The method for detecting random access of UE according to claim 22, further comprising after Step d43 if said conditions are satisfied:

d71) setting a threshold through emulation;

d72) calculating the differences between the maximum correlation peak and each correlation result point outside the correlation peak window but in the correlation result window;

d73) counting the number of the correlation result point with said difference less than said threshold of Step 71;

d74) setting a threshold for said counted number through emulation;

d75) if said counted number is less than said threshold in Step d74, further determining that the condition is satisfied, and otherwise the condition is unsatisfied.

* * * * *